(12) United States Patent
Oyama

(10) Patent No.: US 8,223,253 B2
(45) Date of Patent: Jul. 17, 2012

(54) IMAGE PICKUP DEVICE AND METHOD OF CONTROLLING SAME

(75) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 12/533,620

(22) Filed: Jul. 31, 2009

(65) Prior Publication Data
US 2010/0033592 A1 Feb. 11, 2010

(30) Foreign Application Priority Data

Aug. 7, 2008 (JP) ................................. 2008-204858

(51) Int. Cl.
*H04N 5/232* (2006.01)
(52) U.S. Cl. ....................................... 348/345; 348/349
(58) Field of Classification Search .................. 348/345, 348/349
See application file for complete search history.

(56) References Cited

U.S. PATENT DOCUMENTS

| | | | | |
|---|---|---|---|---|
| 2004/0179129 A1* | 9/2004 | Okawara | ........................ | 348/349 |
| 2008/0024643 A1* | 1/2008 | Kato | ........................ | 348/333.01 |
| 2008/0118156 A1* | 5/2008 | Okada | ........................ | 382/195 |
| 2008/0284900 A1* | 11/2008 | Abe | ........................ | 348/349 |
| 2010/0123782 A1* | 5/2010 | Yata | ........................ | 348/169 |
| 2010/0158491 A1* | 6/2010 | Sugimoto | ........................ | 396/48 |
| 2011/0279701 A1* | 11/2011 | Imamura | ........................ | 348/222.1 |

FOREIGN PATENT DOCUMENTS

| | | | |
|---|---|---|---|
| JP | 2006-330211A | A | 12/2006 |
| JP | 2008-016978A | A | 1/2008 |
| JP | 2008-028959 | A | 2/2008 |
| JP | 2008-139658A | A | 6/2008 |
| JP | 2009-514266A | A | 4/2009 |
| WO | 2007-052572 | A1 | 5/2007 |

* cited by examiner

*Primary Examiner* — James Hannett
(74) *Attorney, Agent, or Firm* — Canon USA, Inc. IP Division

(57) ABSTRACT

If a subject change button of a device is pressed after a face image is detected from moving image data and the number of identified face images is counted, the value of the operation count becomes +1 so that a single face image can be selected. Then, a face image for selection is changed in sequence at the press of the subject change button. If the operation count number exceeds the identified face number of the time, it is determined that a round of the face selection is completed, so that the counted operation number is cleared, the face selection is cancelled, and the device is put on standby.

10 Claims, 6 Drawing Sheets

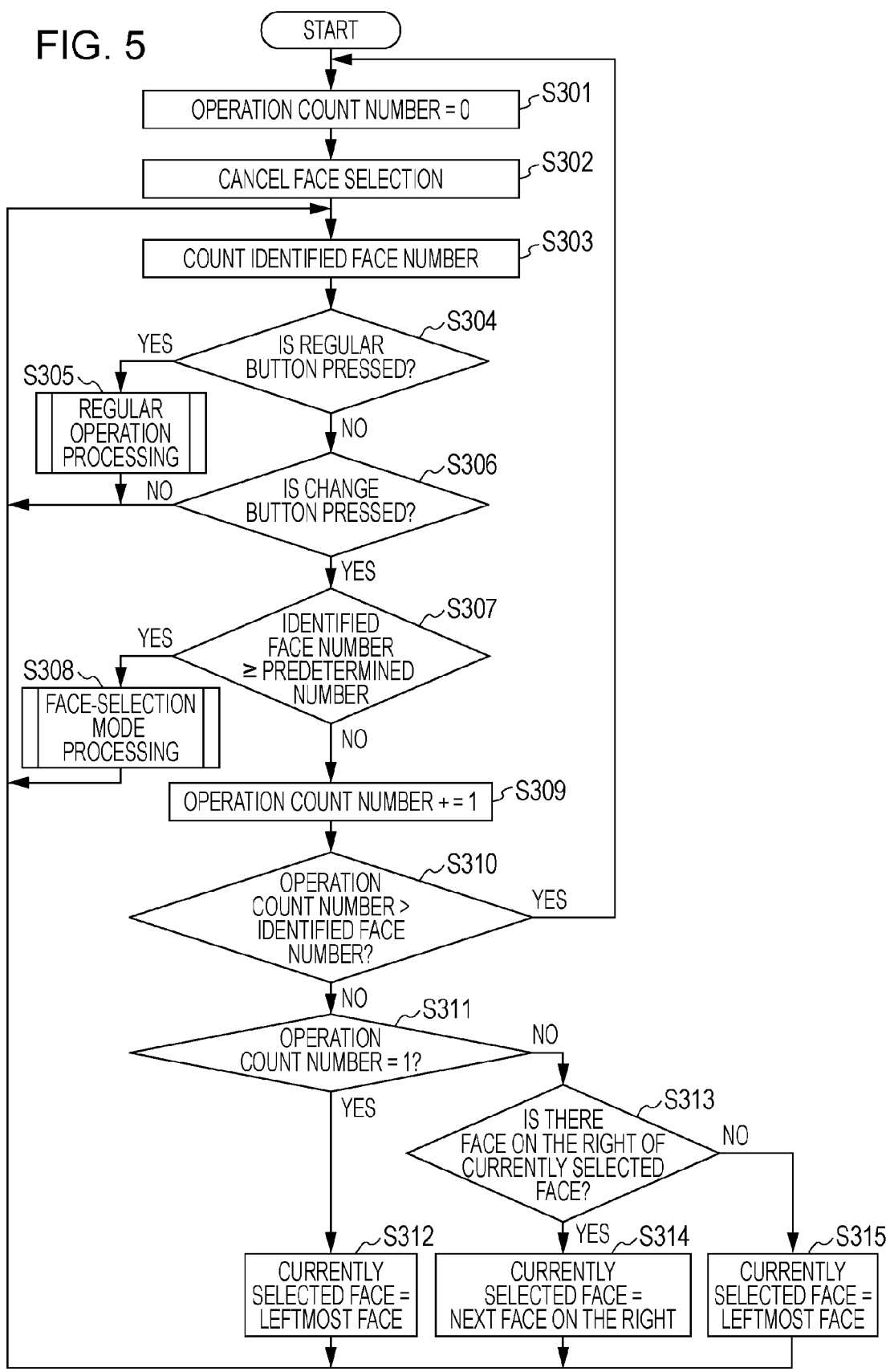

IMAGE PICKUP DEVICE AND METHOD OF CONTROLLING SAME

BACKGROUND OF THE INVENTION

1. Field of the Invention

The present invention relates to an image pickup device that can be appropriately used to perform an operation so as to select a single object from among a plurality of objects detected from moving image data, a method of controlling the image pickup device, and a program.

2. Description of the Related Art

In recent years, image pickup apparatuses configured to identify an object having a predetermined characteristic and perform predetermined processing related to image capturing operations for the object have been renowned.

Further, image pickup apparatuses configured to identify a plurality of objects so that a user can select one of the objects have been renowned. For example, some image pickup devices have been achieved to identify the face of a subject, temporarily enter mode specifically provided to change a face image determined to be an object by a user at the image capturing time, and select the object (the face image of the subject) in the above-described mode by using a general-purpose directional operation component. Further, an image pickup device disclosed in Japanese Patent Laid-Open No. 2008-28959 turns ON/OFF the face identification control for the face image of an identified subject through a specifically designed operation component at the image capturing time. Further, when data of a still image is reproduced, the above-described image pickup device changes the face image of the object through a specifically designed component so as to magnify the image of adjacent areas of the face image identified on the still image.

However, in the above-described known examples, a directional operation component assigned to a different function at the regular image capturing time has been used to select the object, so that the function of the directional operation component is changed to select the object. Therefore, mode specifically designed to select the object should be prepared, which increases the number of operations.

Further, if the component specifically designed to select the object is prepared as disclosed in Japanese Patent Laid-Open No. 2008-28959, the main body of the device is increased in size.

On the other hand, it has been possible to change an object for selection to another object in sequence by using a single operation component alone at the still image reproducing time. However, it has been difficult to change the object at the image capturing time and/or the moving image reproducing time when objects are always moving and changing places so that the number of the objects is always changed. Particularly, an algorithm provided to change an object to another object, the algorithm being provided for a still image, is ineffective to perform change control, in addition to the above-described changes, so as to determine whether or not a single object should be selected.

SUMMARY OF THE INVENTION

Accordingly, the present invention allows for performing a change operation so as to determine whether or not a single object should be selected from transmitted moving image data and an object change operation so as to select the single object at the same time through a single operation component, which facilitates the operations and prevents a device from being increased in size.

An image pickup device according to one aspect of the present invention includes a detecting unit configured to detect at least one object from a moving image, a storing unit configured to store data of a latest number of the detected object, an operation accepting unit configured to accept an operation performed to start selection of the detected object and an operation performed to change the detected object, the operations being performed to select a single object, based on data transmitted through a single operation component, a counting unit configured to count a number of at least one operation of the operation accepting unit, the number of the at least one operation hereinafter referred to as an operation number, and a cancelling unit configured to compare the latest object number to the counted operation number, clear the counted operation number when the counted operation number is determined to be larger than the latest object number, and cancel the single object selection.

According to another aspect of the present invention, a method of controlling an image pickup device is provided, where the method includes detecting at least one object from a moving image, storing data of a latest number of the detected object, accepting an operation performed to start selection of the detected object and an operation performed to change the detected object, the operations being performed to select a single object, based on data transmitted through a single operation component, counting a number of at least one operation of the operation accepting step, and comparing the latest object number to the counted operation number, clearing the counted operation number when the counted operation number is determined to be larger than the latest object number, and cancelling the single object selection.

The present invention allows for performing a change operation so as to determine whether or not a single object should be selected from among a plurality of objects detected from moving image data and an object change operation so as to select the single object through a single operation component, which facilitates the operations and prevents a device from being increased in size.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the present invention and, together with the description, serve to explain the principles of the present invention.

FIG. 5 is a flowchart illustrating processing operations performed in image-capturing mode according to another embodiment of the present invention.

DESCRIPTION OF THE EMBODIMENTS

Exemplary embodiments of the present invention will be described in detail below with reference to the accompanying drawings.

It is to be noted that each of the following exemplary embodiments is merely one example for implementing the present invention and can be appropriately modified or changed depending on individual constructions and various conditions of apparatuses to which the present invention is applied. Thus, the present invention is in no way limited to the following exemplary embodiments.

Hereinafter, embodiments of the present invention will be described with reference to the attached drawings.

First Embodiment

Figure 1:
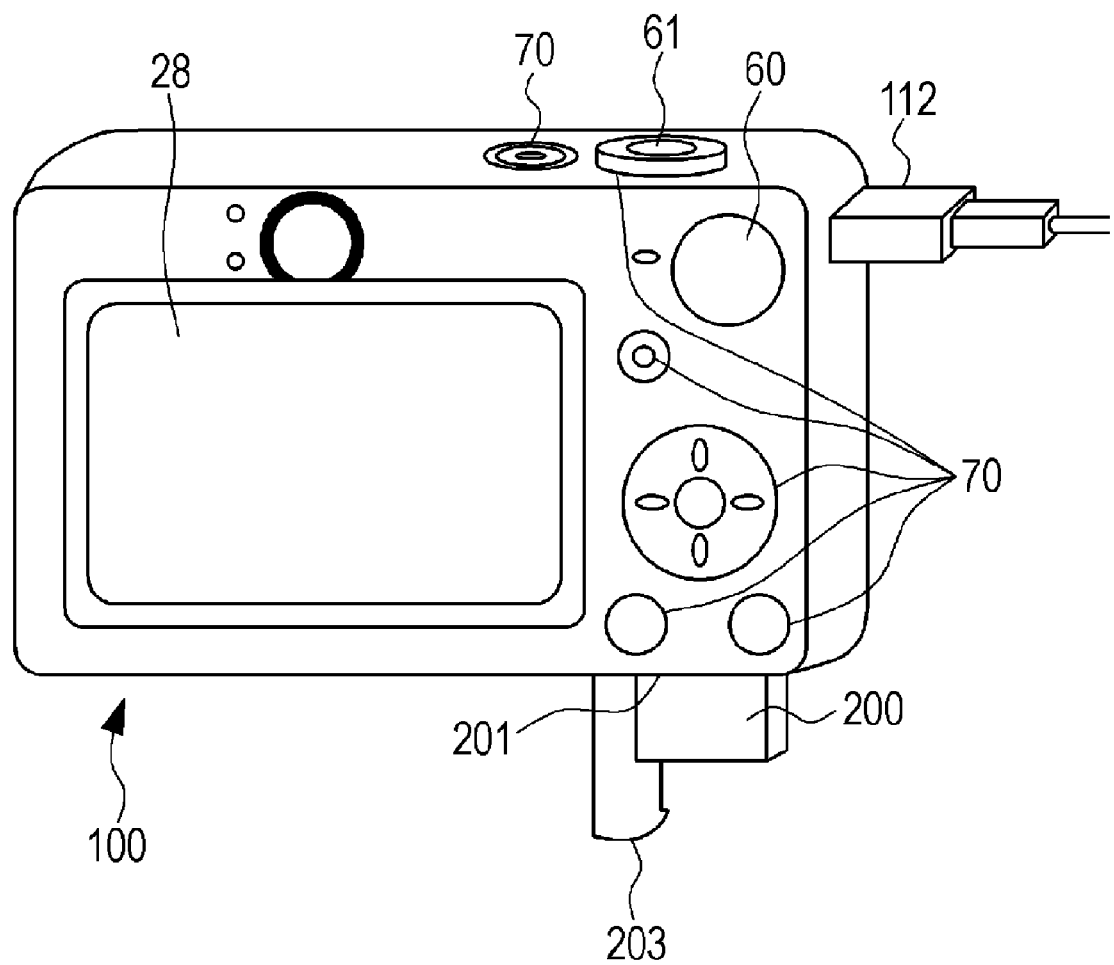
FIG. 1 is the external view of a digital camera according to an embodiment of the present invention.

FIG. 1 shows the external view of a digital camera 100 exemplarily shown as an image pickup device according to a first embodiment of the present invention. An image display unit 28 is configured to display an image and/or various types of information items. A shutter button 61 is an operation component provided to perform image capturing. A mode dial switch 60 is configured to switch between various modes prepared in the digital camera 100. A connector 112 is provided to connect a connection cable to the digital camera 100.

An operation unit 70 is configured to accept various operations performed by the user, where the operation unit 70 is provided with operation components including various types of buttons, a touch panel provided on the image screen of the image display unit 28, and so forth that are shown in FIG. 1. More specifically, the various types of buttons of the operation unit 70 include a delete button, a menu button, a set button, four-direction buttons that are provided in the shape of a cross (an upward button, a downward button, a right button, and a left button), a wheel, and so forth.

A recording medium 200 includes a memory card, a hard disk, and so forth. A recording medium slot 201 is configured to house the recording medium 200. The recording medium 200 housed in the recording medium slot 201 can communicate with the digital camera 100. A lid 202 is provided to cover the recording medium slot 201.

Figure 2:
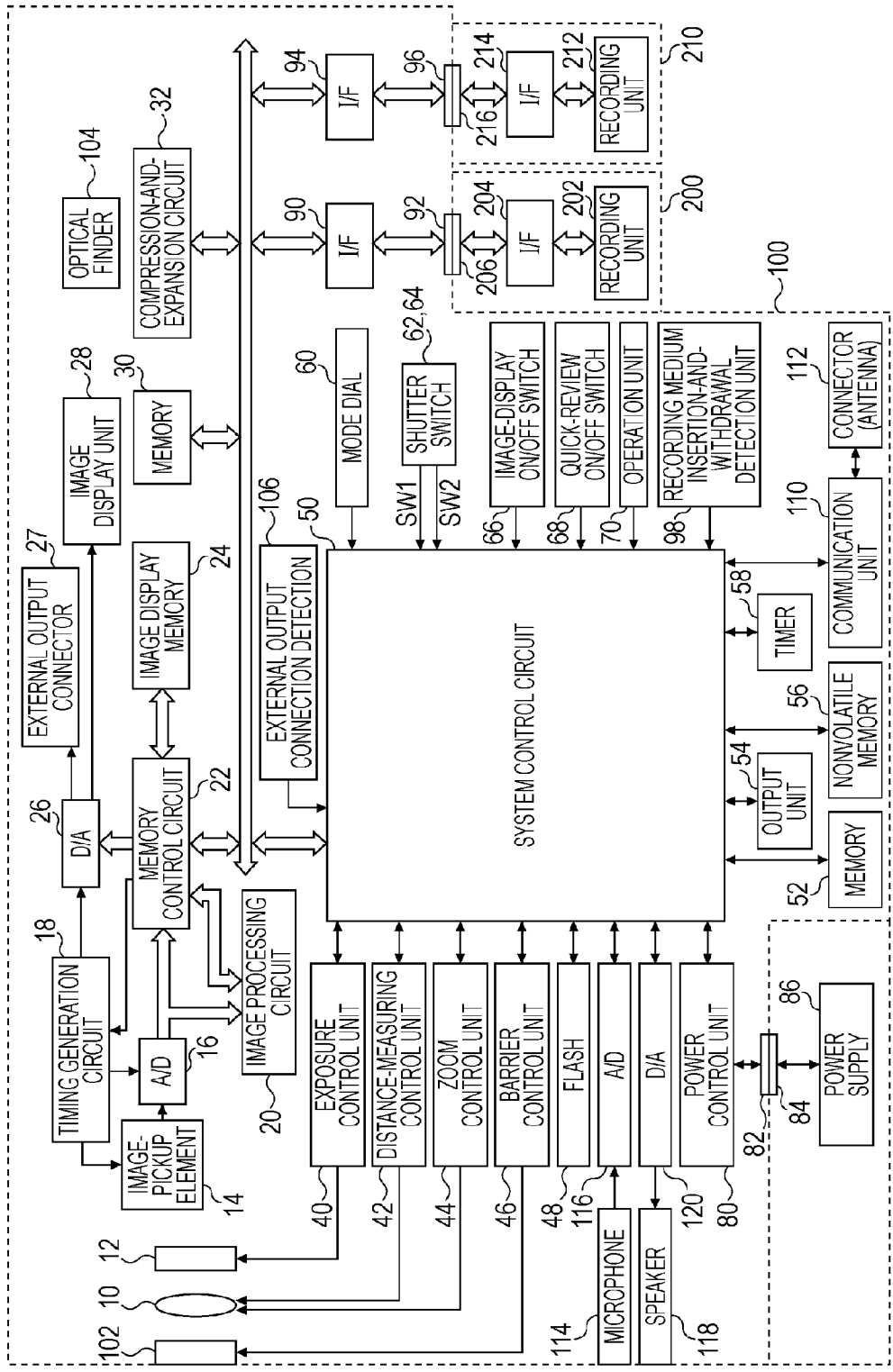
FIG. 2 is a block diagram showing an exemplary hardware configuration of the above-described digital camera.

FIG. 2 is a block diagram showing an exemplary hardware configuration of the digital camera 100. The same components as those shown in FIG. 1 are designated by the same reference numerals. The digital camera 100 includes an imaging lens 10, a shutter 12 having an aperture function, an image-pickup element 14 configured to convert data of an optical image into an electric signal, and an analog-to-digital (A/D) converter 16 configured to convert an analog signal externally transmitted from the image-pickup element 14 into a digital signal. The digital camera 100 further includes a timing generation circuit 18 configured to supply a clock signal and/or a control signal to the image-pickup element 14, the A/D converter 16, and an digital-to-analog (D/A) converter 26 under the control of a memory control circuit 22 and a system control circuit 50.

The digital camera 100 further includes an image processing circuit 20 configured to perform predetermined image interpolation processing and/or color conversion processing for data transmitted from the A/D converter 16 and/or the memory control circuit 22. The image processing circuit 20 performs predetermined calculation processing based on image data obtained through image capturing. The system control circuit 50 performs control based on the calculation result obtained through the calculation processing so that autofocus (AF) processing, autoexposure (AE) processing, and flash exposure (FE) processing, that is, pre-flash processing are performed. Further, in the image processing circuit 20, predetermined calculation processing is performed based on image data obtained through image capturing, and through-the-lens (TTL) auto-white-balance (AWB) processing is performed based on an obtained result of the calculation processing.

The memory control circuit 22 controls the A/D converter 16, the timing generation circuit 18, the image processing circuit 20, an image display memory 24, the D/A converter 26, a memory 30, and a compression-and-expansion circuit 32. Data transmitted from the A/D converter 16 is written into the image display memory 24 and/or the memory 30 via the image processing circuit 20 and the memory control circuit 22. Otherwise, the above-described data is directly written into the image display memory 24 and/or the memory 30 via the memory control circuit 22.

An external output connector 27 is provided to externally transmit data transmitted from the D/A converter 26 to an external monitor. When a connector is inserted into the external output connector 27, an external output connection detection unit 106 notifies the system control circuit 50 about the external output state.

The image display unit 28 includes a thin film transistor (TFT) liquid crystal display (LCD), etc. Image data-for-display written into the image display memory 24 is displayed through the image display unit 28 via the D/A converter 26. An electronic-finder function can be achieved by sequentially displaying picked-up image data items through the image display unit 28. Further, the image display unit 28 can arbitrarily turn on and/or off the display based on an instruction transmitted from the system control circuit 50. When the display is turned off, the power consumption of the digital camera 100 can be significantly reduced.

The memory 30 is configured to store captured data of a still image and/or a moving image and provided with a capacity sufficient enough to store data of a predetermined number of still images and/or moving images of a predetermined time length. Subsequently, in the case where continuous image capturing is performed to obtain a plurality of still images in a row and/or panorama shooting is performed, data of a large number of images can be written into the memory 30 with high speed. Further, the memory 30 may be used as the work area of the system control circuit 50. The memory 30 may further be used as the write buffer of the recording medium 200 and/or a recording medium 210.

The compression-and-expansion circuit 32 is configured to compress and/or expand image data through adaptive discrete cosine transform (ADCT) or the like. Namely, the compression-and-expansion circuit 32 reads the image data stored in the memory 30, performs compression processing and/or expansion processing for the read image data, and writes the compressed and/or expanded image data into the memory 30.

An exposure control unit 40 is configured to control the shutter 12 having an aperture function. The exposure control unit 40 has a flash light control function by operating in collaboration with a flash 48. A distance-measuring control unit 42 is configured to control focusing obtained through the imaging lens 10. A zoom control unit 44 is configured to control zooming performed by the imaging lens 10, and a barrier control unit 46 is configured to control the operation of a barrier 102 provided as a protection member. The flash 48 also has the function of throwing AF auxiliary light and the flash light control function. The exposure control unit 40 and the distance-measuring control unit 42 are controlled under the TTL system. The image data obtained through the image capturing is calculated by the image processing circuit 20, and the system control circuit 50 controls the exposure control unit 40 and the distance-measuring control unit 42 based on the calculation result.

The system control circuit 50 controls the entire digital camera 100. A nonvolatile memory 56 stores a program of instructions (program) for making the system control circuit 50a perform processing according to one or more of the following embodiments of the present invention. A memory 52 is used to expand data of a constant, a variable, the program read from the nonvolatile memory 56, and so forth, the data being used by the system control circuit 50 performing operations. The system control circuit 50 performs processing according to each of the following embodiments of the present invention by executing the program read into the memory 52 from the nonvolatile memory 56.

An output unit 54 includes a liquid crystal display apparatus, a speaker, and so forth, so as to display the operation state, a message, and so forth by using text data, image data, sound data, etc. based on the program executed in the system control circuit 50. The output unit 54 including, for example, a combination of a liquid crystal display (LCD), a light-emitting diode (LED), a sound-generating element, etc., is provided in at least one position near the operation unit 70 of the digital camera 100 so as to be visually recognized by the user with facility. Further, part of the functions of the output unit 54 is provided in the optical finder 104. Of data displayed by the output unit 54, data of the aperture value, the exposure correction, the flash, macro shooting, the buzzer setting, the remaining battery life, an error, the insertion and withdrawal state of the recording mediums 200 and 210, etc. is displayed on the LCD, etc. Further, of the data displayed by the output unit 54, data of focusing, a hand-shake warning, the flash charging, the shutter speed, the aperture value, the exposure correction, etc. is displayed in the optical finder 104.

The nonvolatile memory 56 is electrically erasable and recordable, and provided as, for example, an electrically erasable and programmable read only memory (EEPROM). The nonvolatile memory 56 stores data of a constant, the program, etc., the data being used by the system control circuit 50 performing operations. The above-described program is provided to execute processing procedures shown in various types of flowcharts described in the following embodiments of the present invention.

A timer 58 is used to measure the data recording speed of the recording medium 200 and/or the recording medium 210, and/or the data rate of data for acquisition.

The mode dial switch 60, a shutter switch SW1 (62), a shutter switch SW2 (64), an image display ON/OFF switch 66, a quick review ON/OFF switch 68, and the operation unit 70 are operation units that are provided to transmit instructions to perform various types of operations to the system control circuit 50. The operation units include at least one combination of a switch, a dial, a touch panel, a pointing device used to point a target through the sight line detection, a sound recognition device, etc.

The above-described operation units will be described in detail. The mode dial switch 60 allows for switching between various types of function modes for setting, where the function modes include power OFF mode, automatic image capturing mode, image capturing mode (including panorama shooting mode and moving image shooting mode), reproducing mode, multi-screen reproducing-and-deleting mode, personal computer (PC) connection mode, and so forth.

The shutter switch SW1 (62) is turned on while the shutter button 61 is operated, so as to instruct to start operations including AF processing, AE processing, AWB processing, FE processing, and so forth. The shutter switch SW2 (64) is turned on after the operation of the shutter button 61 is finished, so as to instruct to start the operation of exposure processing. Consequently, a signal read from the image-pickup element 14 is transmitted through the A/D converter 16 and the memory control circuit 22, and written into the memory 30 as image data. At the same time, an instruction to start a series of operations is issued, where the operations include development processing achieved through calculations performed in the image processing circuit 20 and/or the memory control circuit 22 and recording processing including reading the image data from the memory 30, compressing the image data through the compression-and-expansion circuit 32, and writing the image data onto the recording medium 200 and/or the recording medium 210. When shooting moving images, an instruction to start or stop the moving image shooting is issued.

The image display ON/OFF switch 66 has the function of turning ON/OFF the image display unit 28. Therefore, the image display ON/OFF switch 66 can interrupt a current flowing into the image display unit 28 including the TFT LCD or the like before capturing image data through the optical finder 104 so that power consumption is reduced.

The quick review ON/OFF switch 68 sets a quick review function so as to automatically reproduce image data captured immediately after the image capturing is started. Particularly, the function of setting the quick review function when the image display unit 28 is turned off is provided in the above-described embodiment.

The operation unit 70 includes various types of buttons, the touch panel, and so forth. More specifically, the operation unit 70 includes a menu button, a set button, a macro button, a flash setting button, a single shooting/continuous shooting/self-timer change button, an ISO-speed-rating change button, a menu moving + (plus) button, a menu moving − (minus) button, and so forth. Further, the operation unit 70 also includes a subject change button according to an embodiment of the present invention, where the subject change button is provided to perform a change operation so as to determine whether or not a single object should be selected and an object change operation when the single object should be selected. The subject change button will be specifically described later. The above-described subject change button is a single operation component according to the above-described embodiment of the present invention. Further, the operation unit 70 also includes a selection/change button used to set the selection and the change of each of the various functions, a determining button used to set the determination and the execution of each of the various functions, and an operation unit provided to adjust zoom and a wide angle at the image capturing time, adjust magnification and/or reduction at the reproducing time, and switch between single-screen display and multi-screen display.

A power control unit 80 detects whether or not a battery is mounted, the battery type, and the remaining battery life. Further, the power control unit 80 supplies an appropriate voltage to each of components including the recording mediums over an appropriate time period based on the detection result and instructions of the system control circuit 50. Connectors 82 and 84, and a power unit 86 are provided. The power unit 86 includes a primary battery including an alkaline cell, a lithium cell, and so forth, a secondary battery including a NiCd cell, a NiMH cell, a Li cell, and so forth, an alternating current (AC) adapter, etc.

Each of interfaces 90 and 94 is provided between the digital camera 100 and a recording medium including a memory card, a hard disk, and so forth. Each of connectors 92 and 96 is provided to connect the digital camera 100 to the recording medium including the memory card, the hard disk, and so forth. A recording medium insertion-and-withdrawal detection unit 98 is provided to detect whether or not the recording medium 200 and/or the recording medium 210 is inserted into the connector 92 and/or the connector 96.

According to the above-described embodiment, two systems of interfaces and connectors into which the recording mediums are inserted are provided. As a matter of course, at least one system of the above-described interface and the above-described connector may be provided. Further, a combination of an interface and a connector that are manufactured under different standards may be provided. The interface and the connector may be compliant with the standard of a Personal Computer Memory Card International Association (PCMCIA) card, a CompactFlash (CF (Registered Trademark)) card, and so forth. Further, inserting various types of communication cards into the interfaces 90 and 94, and the connectors 92 and 96 allows for transferring image data and/or management information attached to the image data between the digital camera 100 and different devices.

The barrier 102 is provided as a protection member covering the image-pickup unit including the imaging lens 10 of the digital camera 100 so that the image-pickup unit is prevented from being soiled and/or damaged.

It becomes possible to perform image capturing only by using the optical finder 104 without using the electronic finder function of the image display unit 28. Further, the optical finder 104 includes part of the functions of the display unit 54. For example, the optical finder 104 includes the functions of performing the focusing display, the hand-shake warning display, the flash charging display, the shutter speed display, the aperture value display, the exposure correction display, and so forth.

The external output connection detection unit 106 can detect whether or not an external monitor is connected to the external output connector 27. If it is detected that the external monitor is connected to the external output connector 27, the external monitor can be used in place of the image display unit 28 as a display device.

A communication unit 110 has the function of achieving various types of communications performed under the Recommended Standard (RS) 232C, the Universal Serial Bus (USB) standard, the Institute of Electrical and Electronics Engineers, Inc. (IEEE) 1394 standard, the P1284 standard, and the Small Computer System Interface (SCSI) standard, communications performed by using a modem and a local-area network (LAN), wireless communications, and so forth. The connector 112 is provided to connect the digital camera 100 to a different device through the communication unit 110. If wireless communications are performed, the connector 112 is provided as an antenna.

A microphone 114 is provided as a sound-data acquisition unit. An A/D converter 116 performs A/D conversion for sound data obtained through the microphone 114 so that the system control circuit 50 can acquire the sound data. A speaker 118 is provided as a sound-data reproducing unit. A D/A converter 120 performs D/A conversion so that digital sound data transmitted from the system control circuit 50 is reproduced through the speaker 118.

The recording medium 200 includes a memory card, a hard disk, and so forth. The recording medium 200 is provided with a recording unit 202 including a semiconductor memory, a magnetic disk, and so forth, an interface 204 to the digital camera 100, and a connector 206 used to connect to the digital camera 100. Similarly, the recording medium 210 includes a memory card, a hard disk, and so forth. The recording medium 210 is provided with a recording unit 212 including a semiconductor memory, a magnetic disk, and so forth, an interface 214 to the digital camera 100, and a connector 216 used to connect to the digital camera 100. When each of the recording mediums 200 and 210 is a PC card manufactured under the PCMCIA standard, a CompactFlash card, and so forth, the recording medium may include an information storage circuit storing data of performance capabilities.

The above-described digital camera 100 allows for performing image capturing through single-center-point AF and/or face detection AF. The single-center-point AF denotes performing focus adjustment for a single point shown at the center position of the photographic image plane. The face detection AF denotes performing the focus adjustment for a face image produced on the photographic image plane, the face image being detected through a face detection function.

The face detection function will be described. The system control circuit 50 transmits image data for the face detection to the image processing circuit 20. Under the control of the system control circuit 50, the image processing circuit 20 subjects the image data to a horizontal band-pass filter, and subjects the processed image data to a vertical band-pass filter. Consequently, an edge component is detected from the image data through the above-described horizontal and vertical band-pass filters.

After that, the system control circuit 50 performs pattern matching for the detected edge component, and extracts data of a group of candidates for eyes, a nose, a mouth, and an ear. Then, the system control circuit 50 selects candidates satisfying predetermined conditions (e.g., the distance between the two eyes, the inclination, and so forth) from the extracted group of the candidates for the eyes and determines the selected candidates to be a pair of eyes. Then, the system control circuit 50 narrows down data of the pair of eyes only, as the group of candidates for the eyes. Then, the system control circuit 50 associates the above-described eye-candidate group with other parts (the nose, the mouth, the ear) that are included in the face image corresponding to the eye-candidate group, and subjects the eye-candidate group and the other parts to a predetermined non-face condition filter. Consequently, the face image is detected. The above-described processing is exemplary processing performed through a detecting unit according to an embodiment of the present invention.

The system control circuit 50 externally transmits the above-described face information (e.g., information about the number of face images and information about the positions of the eyes, the nose, the mouth, and the ears) based on the face detection result, and terminates the processing. At that time, the face information is stored in the system memory 52.

As described above, it becomes possible to analyze through-displayed image data and extract information about the feature value of the image data so that the object information can be detected. In the above-described embodiment, the face information was exemplarily detected as the object information. However, information about the eye or the like may be detected as the object information according to another embodiment of the present invention.

Further, at the same time as when the face detection AF is performed, face AE, face FE, and face AWB can be performed. The face AE denotes optimizing the exposure of the entire screen image based on the brightness of the detected face image. The face FE denotes performing the light control so as to appropriately adjust the light quantity of a flash for the detected face image. The face AWB denotes adjusting the white balance based on the detected face image.

Figure 3:
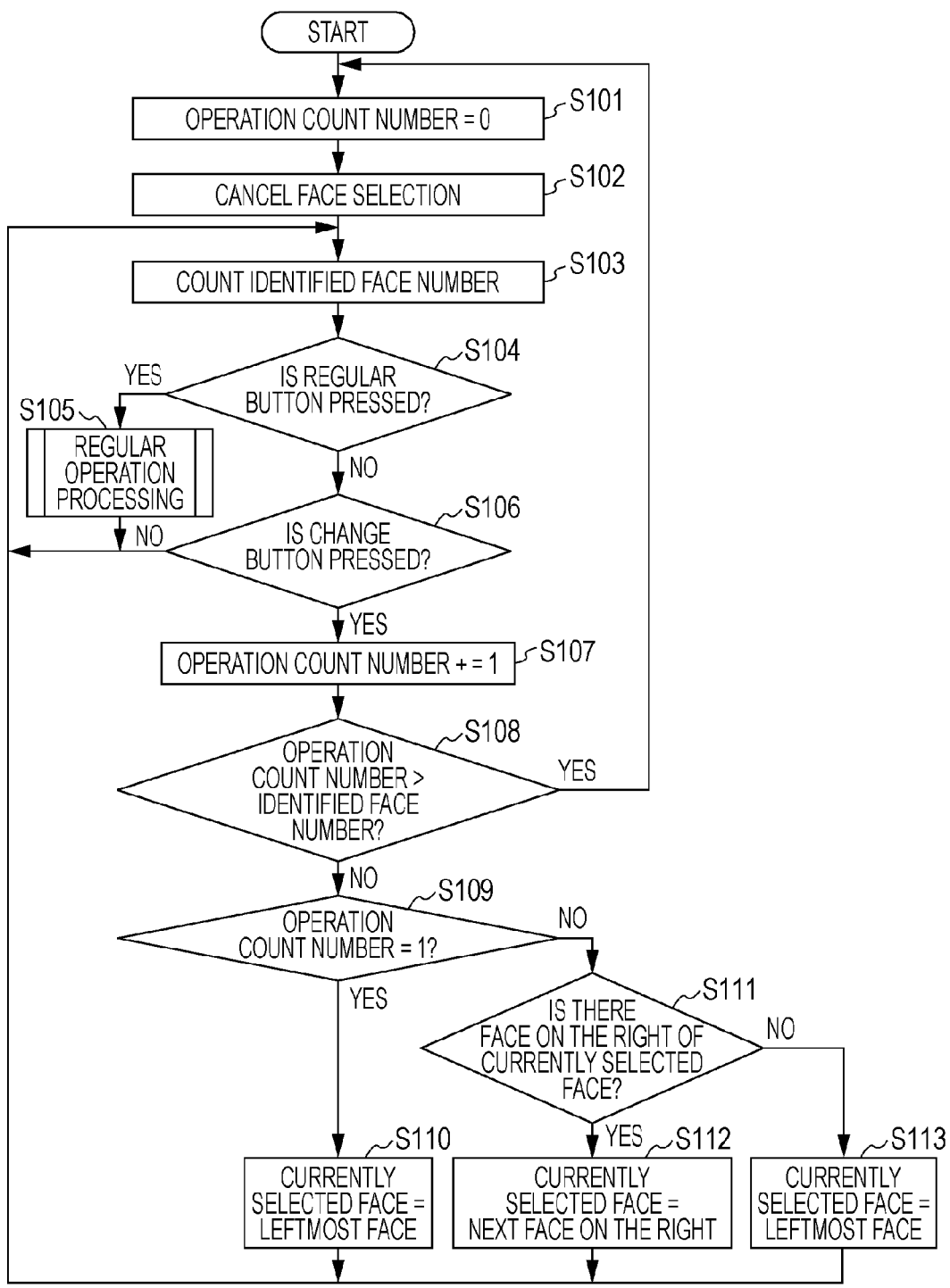
FIG. 3 is a flowchart illustrating processing operations performed in image-capturing mode according to the above-described embodiment.

Next, processing operations performed through the digital camera 100 in the image-capturing mode will be described with reference to a flowchart shown in FIG. 3. The processing operations shown in the flowchart of FIG. 3 are started when the mode dial switch 60 is set to the image capturing mode. In the image capturing mode, data of a live image for through display is transmitted from the image pickup element 14. In the above-described embodiment, the object is determined to be the face of a person. Hereinafter, an operation acceptance operation performed to accept the change operation executed to determine whether or not one of a plurality of face images identified on a live image should be selected and the face change operation executed to select a single face image based on information transmitted through a single operation component will be described.

When the image-capturing-mode processing is started, the system control circuit 50 through-displays the live image on the image display unit 28 based on the transmitted live image data, determines the operation count number to be 0 at step S101, and cancels the face selection made by a user at step S102.

At step S103, the number of face images identified (the identified face number) on a moving image (a live image) is counted, where data of the moving image is transmitted in real time. Data of the above-described identified face number is stored and retained in the memory 30. The above-described processing is processing exemplarily performed by a storing unit according to an embodiment of the present invention.

Next, at step S104, it is determined whether or not a regular operation is performed for image capturing performed by the user. If it is determined that the regular operation is performed at step S104, the processing advances to step S105 so that regular-operation processing is performed. The details of the regular-operation processing will be described below.

If it is determined that the regular operation is not performed at step S104, the processing advances to step S106 where it is determined whether or not the subject change button is pressed. If it is determined that the subject change button is pressed at step S106, the processing advances to step S107 where the value of the operation count is determined to be +1 so that a single face image can be selected. Then, the processing advances to step S108. The above-described processing is processing exemplarily performed by a counting unit according to an embodiment of the present invention. Data of the operation count number is stored and retained in the memory 30. If it is determined that the subject change button is not pressed at step S106, the processing returns to step S103 where the system control circuit 50 is put on standby until the regular operation is performed and the subject change button is pressed while counting the number of face images. Consequently, the latest face image number is identified, and data of the latest face image number is stored and retained. Here, the digital camera 100 may be set to automatic mode in which the digital camera 100 automatically selects the object until the subject change button is pressed.

At step S108, the operation count number and the identified face number are compared to each other. If the operation count number exceeds the identified face number of the time at step S108, it is determined that a round of the face selection is completed. Then, the processing returns to step S101 where the system control circuit 50 determines the value of the operation count number to be 0 (the value of the counted operation number is cleared), cancels the face selection, and is put on standby. Therefore, if the value of the identified face number is 0, the digital camera 100 does not respond to the press of the subject change button.

Figure 6A:
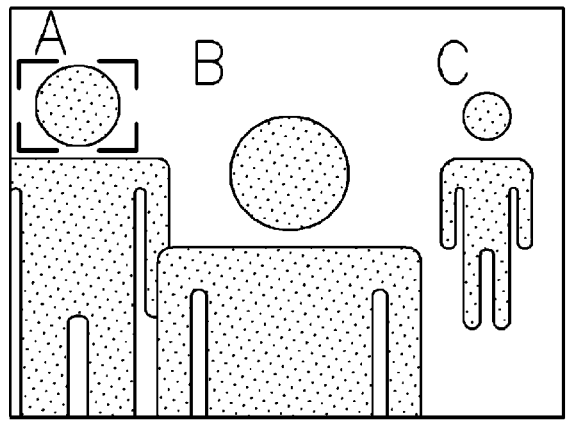
FIG. 6A is provided to illustrate exemplary transition from one screen image to another screen image, the transition being achieved to select a single face image.

If the operation count number does not exceed the identified face number of the time at step S108, the processing advances to step S109 so as to determine whether or not the value of the operation count number becomes 1 so that a single face image can be selected for the first time. If it is determined that the single face image can be selected for the first time at step S109, the processing advances to step S110 where the leftmost of the currently identified face images is determined to be a currently selected face image. Accordingly, the face of a person A shown at the leftmost position is selected as shown in FIG. 6A.

The method of determining the face image selected for the first time is not limited to the above-described method. For example, a face image shown near the center of the screen image, or the largest of the identified face images may be selected as the first face image. Otherwise, if the digital camera 100 is set to automatic mode in which a single face image is automatically selected based on priorities assigned to the identified face images, a face image having the highest priority assigned by the digital camera 100 at the time when step S110 is performed may be determined to be the first face image. The priority is assigned to a face image identified based on the size, the position, the probability of identification, and so forth of the face image.

Figure 6B:
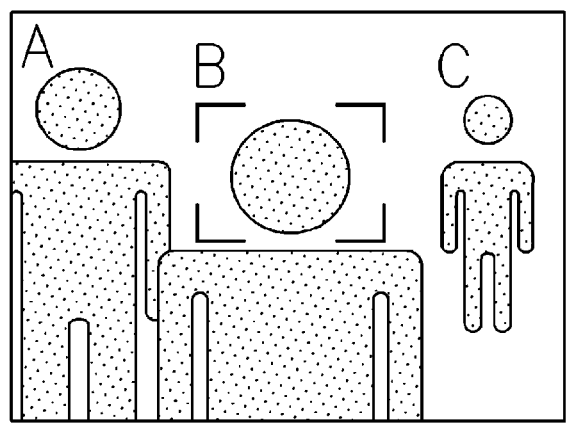
FIG. 6B is also provided to illustrate exemplary transition from one screen image to another screen image, the transition being achieved to select a single face image.

If it is determined that the value of the operation count number is not 1 at step S109, that is to say, if it is determined that a single face image had already been selected and the subject change button had been pressed for several times in that state at step S109, the processing advances to step S111 so as to determine whether or not there is a face image shown on the right of the currently selected face image. If any face image is shown on the right of the currently selected face image, the processing advances to step S112 so that the currently selected face image is changed to the next face image shown on the right of the currently selected face. Consequently, the state shown in FIG. 6B is attained. If no more face images are identified on the right of the currently selected image, that is to say, the state shown in FIG. 6C is attained, the processing advances to step S113 where the leftmost of face images shown on the opposite side (the farthest face image shown on the other side) is selected, so that the state shown in FIG. 6A is attained.

In the above-described embodiment, the direction in which the subject change is made is determined to be the right of the currently selected face image. However, the method of changing the currently selected face image, where the method is started from step S111, is not limited to the above-described method. For example, the currently selected face image may be changed to face images in sequence toward the left direction, or the vertical direction. Otherwise, the currently selected face image may be changed to the face images on a random basis or by a different rule. Namely, it should be uniquely determined whether or not a round of the subject selection is completed based on the operation count number and the identified face number of the time.

Figure 6C:
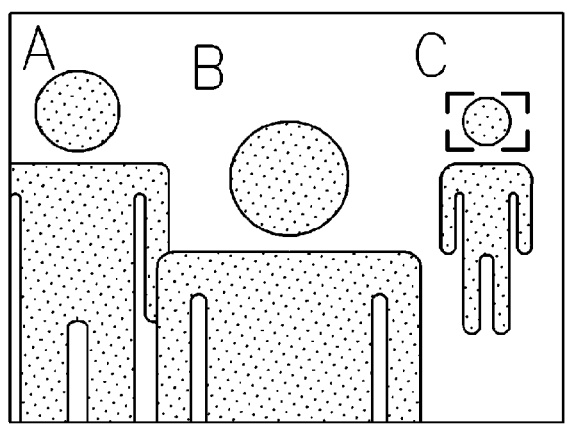
FIG. 6C is also provided to illustrate exemplary transition from one screen image to another screen image, the transition being achieved to select a single face image.

Here, if the subject change button is pressed in the state shown in FIG. 6B (the operation count number is "2" and the identified face number is "3"), the value of the operation count number becomes "3" at step S107, and the state shown in FIG. 6C is attained at step S112. Then, the processing returns to step S103. If the identified face number is not changed at that point, it is determined that a round of the face image selection is completed at step S108 performed after the subject change button is pressed another time (the operation count number "4">the identified face number "3"), and the face selection is cancelled. However, if the identified face number is increased and a person D shows up on the right of a person C at step S103, the currently selected face image is changed to the face image of the person D after step S112 is performed. On the contrary, if the person D shows up on the left of the person C, the currently selected face image is changed to the face image of the person A after step S113 is performed.

Further, if the state shown in FIG. 6B (the operation count number "2" and the identified face number is "3") is attained and the value of the identified face number is not changed when the processing is returned from step S112 to step S103, the currently selected face image is changed to the face image of the person C after the subject change button is pressed another time. However, if the identified face number is decreased, that is to say, if the person A or someone vanishes at step S103, the face selection is cancelled at step S108 because the value of the operation count number already becomes three at step S107 (the operation count number "3">the identified face number "2").

Further, control performed when the person corresponding to the currently selected face vanishes will not be discussed in this specification. For example, the currently selected face image may be caused to transition to the face image of the next person without changing the operation count number, or a selection frame may remain there until the subject change button is pressed another time.

If everyone vanishes, the face selection may be canceled after a timer of a predetermined time period is provided.

Thus, if the number of identified face images is suddenly increased and/or decreased while the processing procedures shown in the above-described flowchart are performed, the value of the latest identified face number is compared, in real time, to that of the operation count number data that had been retained until then. Therefore, the selection state can be temporarily cancelled without exception after a round of the face image selection is completed.

Figure 4:
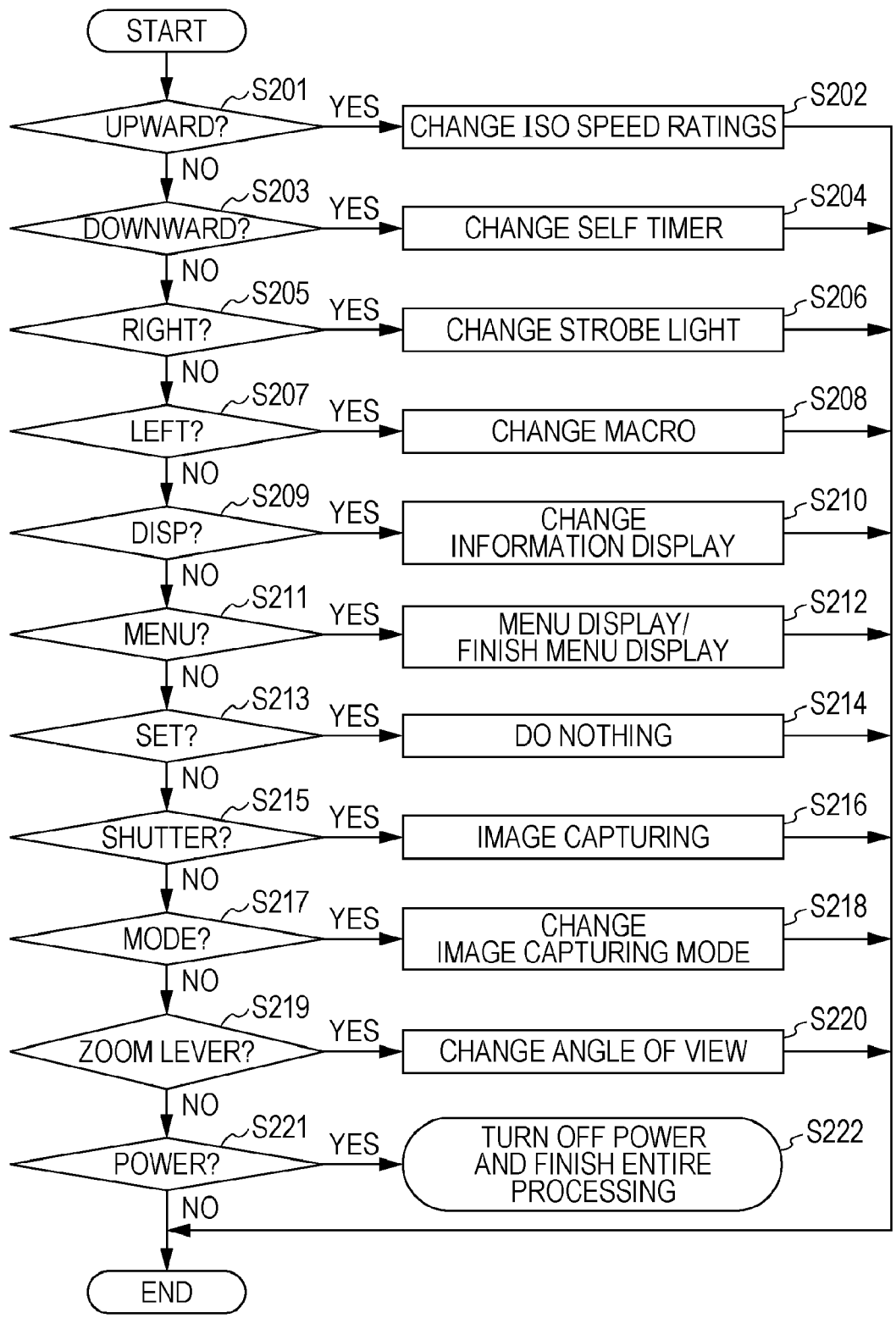
FIG. 4 is a flowchart illustrating regular operation processing performed in the above-described embodiment.

Next, the regular operation processing performed at step S105 will be described with reference to a flowchart shown in FIG. 4. If an operation relating to regular image-capturing operations is performed at step S104 while the system control circuit 50 waits until the subject change button is pressed while counting the identified face number at steps S103 to S106 that are shown in FIG. 3, the corresponding processing is performed based on the pressed button.

That is to say, when the upward button is pressed at step S201, the ISO speed ratings are changed at step S202. If the downward button is pressed at step S201, a self timer is changed to another self timer at step S204. If the right button is pressed at step S205, settings on a strobe are changed at step S206. If the left button is pressed at step S207, a macro is changed to another macro at step S208.

If a display button (Disp button) is pressed at step S209, the pattern of displaying various information on the image display unit 28 is changed at step S210. If the menu button (Menu button) is pressed at step S211, the screen image is caused to transition to a setting screen produced to make various settings on the digital camera 100, and the state of the setting screen is returned to the original state when the menu button is pressed again at step S212. If a set button (Set button) is pressed at step S213, no operation is performed at step S214.

If the shutter button is pressed at step S215, image capturing is performed based on the current settings at step S216. When a single face image is selected, for example, the image capturing is achieved by performing at least one of the face detection AF, the face AE, the face FE, and the face AWB for the selected face image. If no face image is selected and an AF frame is fixed at the center of the screen image, image capturing is achieved by performing distance measuring for a subject existing at the center of the screen image (single-center-point AF) and metering for the subject.

If the mode dial switch 60 is operated at step S217, the image capturing mode is changed at step S218. If the zoom lever is operated at step S219, the angle of view is changed at step S220. If a power button is pressed at step S221, the entire processing is terminated and the power is turned off at step S222, and the above-described flow is also finished.

In addition, processing and functions that are provided for regular operations relating to the above-described image capturing are not limited to those of the above-described embodiment. Further, the method of arranging the functions provided for the operation components and operating the operation components is not limited to that of the above-described embodiment.

Thus, according to the above-described embodiment, a change operation performed to determine whether or not a single face image is selected from among a plurality of face images detected from moving image data and a face change operation performed to select the single face image can be performed by using a single operation component. Therefore, it becomes possible to prevent a device from being increased in size as the number of operation components is increased so as to attain high performance and perform a selection-and-change operation with speed and facility for an object shown in a moving image from which immediacy is expected. Further, the above-described embodiment eliminates the necessity to shift to mode specifically designed to switch between face images. Therefore, it becomes possible to perform a subject change operation by using the subject change button in parallel with regular operation processing performed by using an operation component other than the subject change button. Consequently, it becomes possible to perform a setting operation relating to imaging from which immediacy is expected with speed during an operation performed to select the object.

For performing the face change operation by using a single operation component according to a method other than the method of the above-described embodiment, the following method may be considered. For example, the selection priority is assigned to each of a plurality of face images for identification and each of the face images is selected according to its selection priority based on the number of operations of the single operation component. However, the subject moves in real time in moving images and the number and the positions of identified face images are frequently changed according to the capability of attaining the identification precision. Therefore, the selection priority is changed and assigned to each of the face images each time the number of identified face images is increased and/or decreased. In that case, the currently selected face image is not changed to the next face image, or is returned to the previous face image depending on the circumstances even though the change operation is performed.

Suppose the selection priorities "1", "2", and "3" are individually assigned to the face images of the persons A, B, and C and the face image of the person C currently having the selection priority "3" is selected in the state shown in FIG. 6C. If the person D shows up between the persons C and B, the selection priorities are changed so that the selection priorities "1", "2", "3", and "4" are individually assigned to the face images of the person A, B, D, and C from the left in sequence. If the subject change button is pressed at that time, the person having the selection priority "4" is selected next time. Therefore, the face image of the person C is selected again. Therefore, in appearance, the selection is not caused to transition from the face image of the person C even though the subject change button is pressed. In that case, the user may determine that the operation of the subject change button is ineffective by mistake.

Suppose the selection priorities "1", "2", and "3" are individually assigned to the face images of the persons A, B, and C and the face image of the person C currently having the selection priority "3" is selected in the state shown in FIG. 6C. If the person D and a person E show up between the persons C and B, the selection priorities are changed so that the selection priorities "1", "2", "3", "4", and "5" are individually assigned to the face images of the person A, B, D, E, and C from the left in sequence. If the subject change button is pressed at that time, the person having the selection priority "4" is selected next time. Therefore, the face image of the person E shown on the left of the person C who was selected last time is selected next time. If the subject change button is pressed again, the face image of the person C having the selection priority "5" is selected again. In appearance, therefore, the currently selected face image is shifted back to a face image shown on the left by as much as a single person at the press of the subject change button, which decreases the operability of the digital camera 100. If the selection priorities "1", "2", "4", "5", and "3" are individually assigned to the persons A, B, D, E, and C in that state, the device should identify that the rightmost of the detected five face images is the face image of the person C. However, the cost of the device is increased and the processing is complicated so as to use the function of identifying the face image of each person.

The above-described embodiment allows for causing the face image for selection to transition to the adjacent face image with reliability at the press of the subject change button without using the function of identifying the face image of each person. Further, the above-described embodiment allows for cancelling the face image selection in response to the completion of a round of the face image selection.

Second Embodiment

Next, a second embodiment of the present invention will be described. Since a digital camera according to the second embodiment has the same configuration as that of the digital camera according to the first embodiment, redundant description thereof will be omitted. In the first embodiment, the face image for selection is changed to other face images in sequence at the press of the subject change button. If the face selection is made past a target face image, all of the face images should be checked again so as to select the target face image again. Therefore, the number of operations is increased particularly when there is a large number of face images. The second embodiment has been achieved to solve the above-described problems.

FIG. 5 is a flowchart illustrating processing operations performed when the image capturing mode is selected in a digital camera 100 according to the second embodiment. The processing operations shown in the flowchart of FIG. 5 are also started when the mode dial switch 60 is set to the image-capturing mode.

The processing operations performed at steps S301 to S306 are the same processing operations as those performed at steps S101 to S106 that are shown in FIG. 3. In the second embodiment, when the subject change button is pressed at step S306, it is determined whether or not the identified face number of the time exceeds a predetermined number at step S307. If the identified face number is smaller than the predetermined number, the processing advances to step S309 or later. The processing operations performed at steps S309 to S315 are the same processing operations as those performed at steps S108 to S113 that are shown in FIG. 3.

If the identified face number exceeds the predetermined number at step S307, the processing advances to step S308 where the processing is caused to transition to face selection mode processing so that the face selection is performed. According to the face selection mode processing, the mode is temporarily caused to transition to mode specifically provided to make the face selection so as to differentiate between the face selection mode processing and the regular operation processing. In the specifically provided mode, the face image for selection is changed to the adjacent face image at the press of the left button and/or the right button.

In the second embodiment, the face image for selection can be changed by using the left button and/or the right button particularly when there is a large number of face images. Therefore, if the face selection is made past the target face image when the right button is pressed several times, for example, the target face image can be selected again by pressing the left button, which decreases the number of operations. However, as long as the mode specifically provided to make the face selection is selected, it is difficult to change the strobe and the macro by pressing the left button and the right button.

If the identified face number is smaller than the predetermined number, the second embodiment allows for accepting the change operation performed to determine whether or not the single face image should be selected and the face change operation performed to select the single face image based on data transmitted through the subject change button. If the identified face number is larger than the predetermined number, the predetermined conditions mentioned in the above-described embodiment are satisfied. However, the dividing method used in an embodiment of the present invention is not particularly limited. For example, a method allowing for switching to the face selection mode processing at a long press of the subject change button may be used.

Further, in each of the above-described embodiments, live image data obtained at the imaging time is exemplarily described as the moving image data transmitted to the digital camera. However, moving image data reproduced in the reproducing mode may be transmitted to the digital camera in place of the line image data, which constitutes another embodiment of the present invention.

The present invention may be achieved by supplying a storage medium that stores the program of instructions comprising software code for implementing the functions of the above-described embodiments to a system and/or an apparatus so that a computer (a central processing unit (CPU) and/or a microprocessing unit (MPU)) of the system and/or the apparatus reads and executes the program code stored in the storage medium to implement one or more of the embodiments of the present invention.

In that case, the program of instructions itself, read from the storage medium and executed by the computer, achieves the functions of one or more of the above-described embodiments, and thus the program of instructions itself and the storage medium storing the program of instructions constitute an embodiment of the present invention.

The storage medium for supplying the program of instructions may be, for example, a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

Furthermore, not only by the computer reading and executing the program of instructions, but also by the computer executing part of or the entire actual processing by utilizing a basic system or an operating system (OS), etc. running on the computer based on instructions of the program code, the functions of the above-described embodiments may be achieved. The latter is also one of embodiments of the present invention.

Further, the program of instructions read from the storage medium may be written into a memory provided in a function expansion board inserted into the computer and/or a function expansion unit connected to the computer. After that, a CPU or the like provided in the function expansion board and/or the function expansion unit may execute part of or the entire actual processing based on instructions of the program of instructions so that the functions of the above-described embodiments are realized, which constitutes another embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-204858 filed on Aug. 7, 2008, which is hereby incorporated by reference herein in its entirety.

What is claimed is:

1. An image pickup device comprising:
    a detecting unit configured to detect at least one object from a moving image;
    a storing unit configured to store data of a latest number of the detected object;
    an operation accepting unit configured to accept an operation performed to start selection of the detected object and an operation performed to change the detected object, the operations being performed to select a single object, based on data transmitted through a single operation component;
    a counting unit configured to count a number of at least one operation of the operation accepting unit, the number of the at least one operation hereinafter referred to as an operation number; and
    a cancelling unit configured to compare the latest object number to the counted operation number, clear the counted operation number when the counted operation number is determined to be larger than the latest object number, and cancel the single object selection.

2. The image pickup device according to claim 1, wherein when an object for selection is changed after the operation performed to start selection of the detected object is accepted, and when at least one object exists in a predetermined direction with reference to a currently selected object, the object for selection is changed to a closest object existing in the predetermined direction, and wherein when no object exists in the predetermined direction, the object for selection is changed to a farthest object existing in a direction opposite to the predetermined direction.

3. The image pickup device according to claim 1, wherein the detected object is a face of a person.

4. The image pickup device according to claim 1, further comprising a processing unit configured to perform any one of focus adjustment processing, exposure adjustment processing, white balance adjustment processing, and light control processing for the selected single object.

5. The image pickup device according to claim 1, wherein the moving image is a live image obtained at image capturing time.

6. The image pickup device according to claim 1, wherein the moving image is obtained by reproducing recorded moving image data.

7. The image pickup device according to claim 1, wherein the operation accepting unit accepts the operation performed to start selection of the detected object and the operation performed to change the detected object based on the data transmitted through the single operation component only when at least one predetermined condition is satisfied.

8. The image pickup device according to claim 7, wherein the predetermined condition denotes that a number of the at least one detected object is equal to or less than a predetermined number.

9. A method of controlling an image pickup device, the method comprising:
    detecting at least one object from a moving image;
    storing data of a latest number of the detected object;
    accepting an operation performed to start selection of the detected object and an operation performed to change the detected object, the operations being performed to select a single object, based on data transmitted through a single operation component;
    counting a number of at least one operation of the operation accepting step, the number of the at least one operation hereinafter referred to as an operation number; and
    comparing the latest object number to the counted operation number, clearing the counted operation number when the counted operation number is determined to be larger than the latest object number, and cancelling the single object selection.

10. A non-transitory recording medium readable by a computer and storing a program of instructions executable by the computer to perform a method of controlling an image pickup device, the method comprising:
    detecting at least one object from a moving image;
    storing data of a latest number of the detected object;
    accepting an operation performed to start selection of the detected object and an operation performed to change the detected object, the operations being performed to select a single object, based on data transmitted through a single operation component;
    counting a number of at least one of the operations, the number of the at least one of the operations hereinafter referred to as an operation number; and
    comparing the latest object number to the counted operation number, clearing the counted operation number when the counted operation number is determined to be larger than the latest object number, and cancelling the single object selection.

* * * * *